United States Patent
Turner et al.

[11] Patent Number: 5,944,075
[45] Date of Patent: Aug. 31, 1999

[54] REMOVABLE QUICK-FILL FUEL CAP

[76] Inventors: Delwin James Turner, 3725 W. Evans Dr., Phoenix, Ariz. 85023; John Raymond Strong, 4240 E. Raven Rd., Phoenix, Ariz. 85044

[21] Appl. No.: 09/020,250

[22] Filed: Feb. 6, 1998

[51] Int. Cl.$^6$ ................................................ B65B 1/04
[52] U.S. Cl. .................... 141/348; 141/301; 220/86.2; 220/DIG. 33
[58] Field of Search .................... 141/348, 349, 141/350, 301; 220/86.2, DIG. 33

[56] References Cited

U.S. PATENT DOCUMENTS

| | | | |
|---|---|---|---|
| 1,810,366 | 6/1931 | Martin | 141/349 |
| 5,056,570 | 10/1991 | Harris et al. | |
| 5,271,438 | 12/1993 | Griffin et al. | |
| 5,520,300 | 5/1996 | Griffin | 220/86.2 |
| 5,634,505 | 6/1997 | Wong | |
| 5,730,194 | 3/1998 | Foltz | 141/301 |

OTHER PUBLICATIONS

IMS 1997 Products Catalog, IMS Racing Products web page at http://www.imsproducts.com, Quick–Fill Systems.

*Primary Examiner*—Steven O. Douglas
*Attorney, Agent, or Firm*—David J. Zwick

[57] ABSTRACT

A removable fuel cap for use in a quick-fill refueling system for a motorcycle during a motorcycle race. The fuel cap comprises a movable plunger in a cylindrical windowed housing, the plunger being normally held in a closed position by a coil spring. The cylindrical housing and plunger assembly is inserted into the fuel tank opening and is held in place by a threaded retaining cap that screws onto the threaded gas cap flange. The retaining cap has a circular opening that allows access to the plunger. The fuel cap works in concert with commercially available quick-fill fuel containers. The quick-fill fuel cap is easily and quickly removed by unscrewing the retaining cap and removing the plunger assembly.

10 Claims, 3 Drawing Sheets

REMOVABLE QUICK-FILL FUEL CAP

FIELD OF THE INVENTION

The present invention relates to refueling systems, and more particularly to a removable fuel cap for use in a quick-fill refueling system for, for example, a motorcycle during a motorcycle race.

BACKGROUND OF THE INVENTION

In motorcycle racing, periodic pit stops are required to, for example, perform service activities on the motorcycle, possibly replace tires, give the driver a fresh set of goggles, and refuel the motorcycle. The duration of most pit stops is related primarily to the time needed to refuel the motorcycle so that the motorcycle can resume the race.

For a motorcycle team to be competitive, it is essential that the cumulative time in the pit be as short as possible. In a typical long distance race, each motorcycle will require numerous pit stops in order to complete the race. Additionally, in recent years, the design for motorcycle styling has shifted to a more compact, narrower sitting area. As a result, the design of fuel tanks has evolved in efforts to reduce the size and weight of the fuel tank leading to a reduction in fuel tank capacity. This reduction in fuel tank capacity has necessitated an even greater number of pit stops during a typical race event. Therefore, a team that can reduce the refueling time during its pit stops can gain a competitive advantage over the other race participants.

Typically in amateur racing, when a motorcycle comes into the pit for refueling, one of the pit crew members unscrews the standard fuel cap by hand. Upon removing the fuel cap, a second crew member inserts the nozzle of a common fuel can into the opening of the fuel tank and dispenses fuel into the tank. Upon completion of the refueling, the fuel can is withdrawn and the fuel cap is screwed on by hand by the first pit crew member and the motorcycle is ready to continue the race.

A problem with the typical method is the amount of time required to remove and then replace the fuel cap. Another problem is effectively coordinating the activities of the two crew members involved in the refueling process to achieve the shortest refueling time.

One approach to reducing the refueling time is to install a quick-fill system such as those offered by IMS Racing Products Corp. In their system, the fuel cap is replaced by an assembly having a movable plunger that is normally spring biased in a closed position and that provides access to the fuel tank when the plunger is depressed. The plunger is recessed approximately one half inch to assist in guiding the nozzle of a specialized fuel container to the plunger. This assembly works in conjunction with a fuel container having a nozzle proportioned to be inserted into the fuel tank by depressing the plunger. The container further has a fuel release mechanism that is actuated after the nozzle has been inserted into the tank, thereby dispensing fuel into the tank. The fuel release mechanism of the fuel container includes a stopper attached to a windowed cylindrical sleeve in the container nozzle. Fuel is released via exterior release handles that extend the stopper and windowed sleeve out of the nozzle allowing fuel to flow freely through the sleeve windows. When refueling is complete, the exterior fuel release handles are returned to their normally "closed" position and the fuel container nozzle is withdrawn allowing the plunger to return to its normally closed position.

Extensive and permanent modifications to the motorcycle fuel tank are required to install this system. The protruding threaded flange that the stock fuel cap screws onto is cut off of the tank, forming a flush face containing the fuel dispensing opening. The plunger assembly is then inserted into the opening and secured to the tank with through screws. The installation also requires that an additional hole be drilled in the top of the tank for a ventilation check valve to relieve any vacuum that may form as the engine draws fuel from the tank.

Alternatively, a fuel tank that includes these modifications and is specific to the make and model of motorcycle may be purchased from IMS Racing Products and installed on the motorcycle.

A problem with the first approach is that it requires extensive and permanent modifications to the motorcycle fuel tank such that refueling by conventional means, such as a common gas can or a service station fueling nozzle, is no longer possible.

A problem with the alternative approach is that, while the modification to the fuel system is not permanent, to remove the modified fuel tank and reinstall the standard one is a significant task requiring a substantial amount of time.

Another problem with both approaches is that dirt collects in the recess on top of the plunger and is flushed into the fuel tank upon refueling.

Accordingly, it is an object of the present invention to provide a quick-fill refueling system that requires no modifications to the motorcycle fuel tank.

Another object of the invention is to provide a quick-fill refueling system that can be easily and quickly installed as required, for example for a race, and easily and quickly removed when the race is concluded.

Another object of the invention is to provide a quick-fill refueling system that can be used interchangeably on many different fuel tanks.

Another object of the invention is to provide a quick-fill refueling system that is self-ventilating.

Another object of the invention is to provide a quick-fill refueling system that reduces the opportunity for dirt to enter the fuel tank during a refueling operation.

SUMMARY OF THE INVENTION

The present invention is a quick-fill fuel cap that is used in conjunction with one of the commercially available quick-fill fuel containers. The fuel cap comprises a movable plunger in a cylindrical windowed housing, the plunger being normally held in a closed position by a spring. The plunger includes a raised center section that fits into the top opening of the housing such that the top edge of the plunger is flush with the cap. The top surface of the plunger can include a slight concavity to aid in aligning the fuel container nozzle for insertion into the quick-fill fuel cap.

The plunger includes a check valve that is vented to the outside that prevents a vacuum from forming in the fuel tank as fuel is drawn from the tank by the motorcycle engine. The cylindrical housing and plunger assembly is inserted into the fuel tank opening until an outer shoulder near the upper end of the housing rests on the upper edge of the threaded gas cap flange. The housing is held in place by a threaded retaining cap that screws onto the threaded gas cap flange and secures the shoulder to the upper edge of the threaded gas cap flange. The retaining cap has a circular opening that allows access to the plunger. When the retaining cap is screwed into place, the top of the retaining cap is flush with the tops of the exposed housing and the plunger. The plunger assembly and retaining cap can be manufactured in a small number of different sizes to fit almost all standard motorcycle fuel tanks.

In use, the standard gas cap is removed and the cylindrical housing and plunger assembly is inserted into the fuel tank and secured by the retaining cap. To refuel the motorcycle, the nozzle of a quick-fill container is inserted into the quick-fill cap and partially depresses the plunger. The fuel release mechanism of the container is then actuated, further depressing the plunger and exposing the housing windows allowing fuel to flow from the container into the fuel tank through the windows.

After the race event, the quick-fill fuel cap is easily and quickly removed by unscrewing the retaining cap and removing the plunger assembly. The standard gas cap can now be reinstalled.

DETAILED DESCRIPTION OF THE PREFERRED EMBODIMENT

Figure 1:
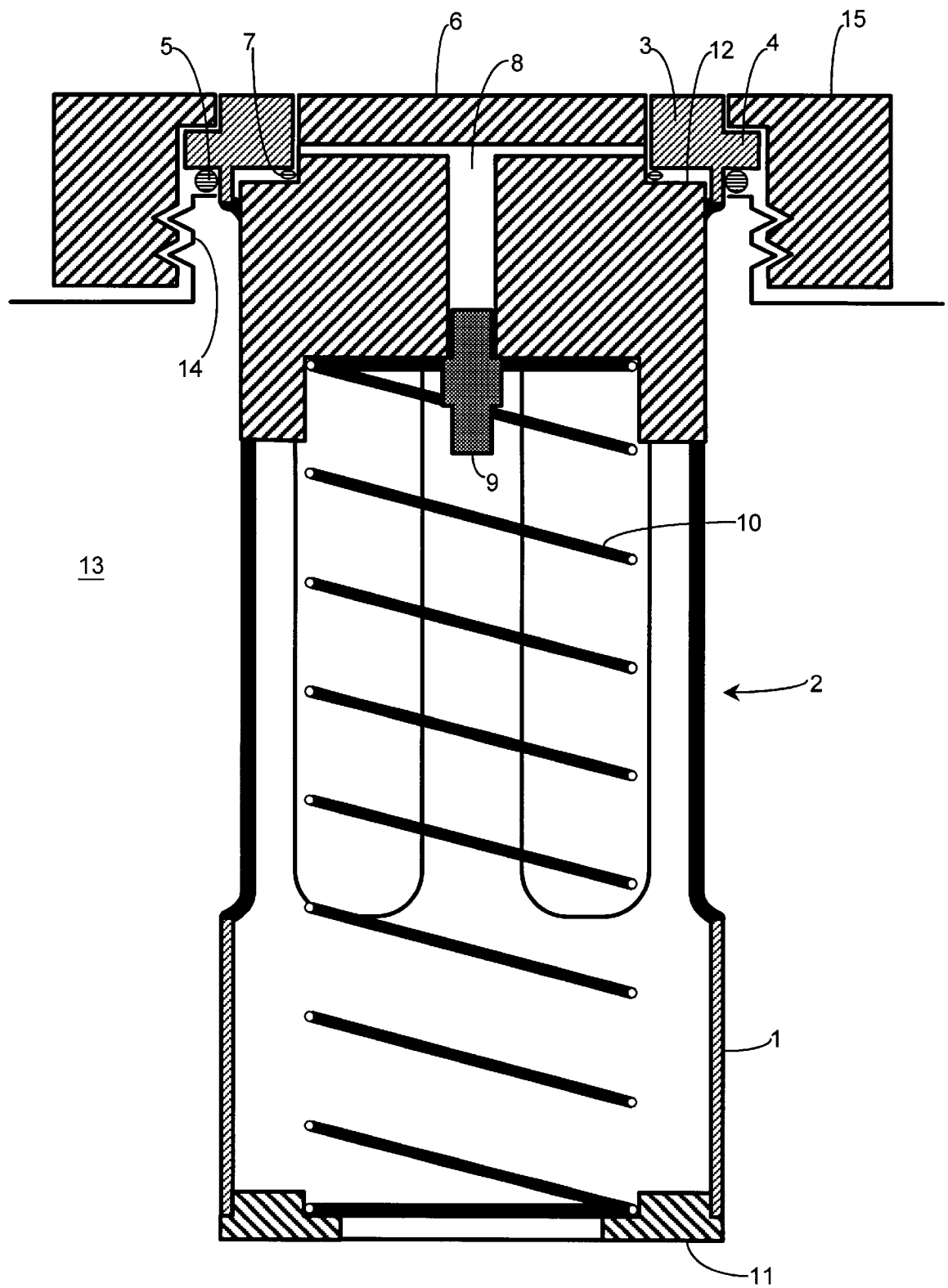
FIG. 1 shows a cross sectional view of the preferred embodiment of the present invention in a normal closed configuration.

FIG. 1 shows a cross sectional view of the preferred embodiment of the present invention. Housing 1 is cylindrical with six oblong axially oriented windows 2. FIG. 1 shows two windows in the back of housing 1 and one each in cross section on each side of housing 1. Housing 1 has an inner shoulder 3 forming a smaller circular opening at the top of housing 1 than is at the bottom of housing 1, and an outer annular shoulder 4. A first sealing ring 5 fits snugly around housing 1 at the juncture with the bottom of outer annular shoulder 4. Preferably, housing 1 is made of hard anodized aluminum. Backstop ring 11 is secured to the bottom of housing 1.

Plunger 6 fits inside of housing 1 with an outer diameter sufficiently smaller than the inner diameter of housing 1 to just allow for free axial movement within housing 1. Plunger 6 is preferably of a hard plastic having minimal reaction to motorcycle fuels. Plunger 6 has a raised center section that extends into and essentially fills the top circular opening of housing 1, and defines a top shoulder 12 on plunger 6. A second sealing ring 7 fits snugly around the raised center section at the juncture with top shoulder 12. Top shoulder 12 mates with bottom of inner shoulder 3 of housing 1 such that when plunger 6 is biased towards the top of housing 1, thus compressing second sealing ring 7, the top edge of plunger 6 is flush with the top surface of housing 1. Plunger 6 is shown with a flat top face, however a slight concavity can be included to aid in the refueling process, Alternatively, the inner edge of inner shoulder 3 can be cambered, with the top edge of plunger 6 flush with the inner cambered edge of inner shoulder 3 when plunger 6 is in its closed position. Plunger 6 has a venting orifice 8 comprising an axial orifice open at the bottom of plunger 6 communicating with a diametrical orifice with openings on the outer surface of the raised center portion of plunger 6 above second sealing ring 7. Check valve 9 is set into the bottom opening of venting orifice 8. Plunger 6 further has a hollow in its bottom face to hold the top of coil spring 10. Coil spring 10 reacts against backstop ring 11 to spring-bias plunger 6 into its normally closed position.

Housing 1 is inserted into fuel tank 13 until first sealing ring 5 engages the top lip of threaded gas cap flange 14. The entire plunger assembly is secured in place by retaining cap 15 which is screwed onto threaded gas cap flange 14, thus compressing first sealing ring 5. Retaining cap 15 has a circular opening defining an inner lip such that when retaining cap 15 is screwed onto threaded gas cap flange 14, the inner lip engages the top surface of outer annular shoulder 4, and the top surface of retaining cap 15 is flush with the top surface of housing 1 and the top edge of plunger 6 when plunger 6 is in its normally closed position.

When the quick-fill fuel cap is installed and plunger 6 is in its normally spring-biased closed position, as shown in FIG. 1, sealing rings 5 and 7 provide an air- and fuel-tight seal. As fuel is drawn into the engine from fuel tank 13, check valve 9 allows outside air to be drawn into fuel tank 13 through venting orifice 8 to relieve any vacuum that may occur.

Figure 2:
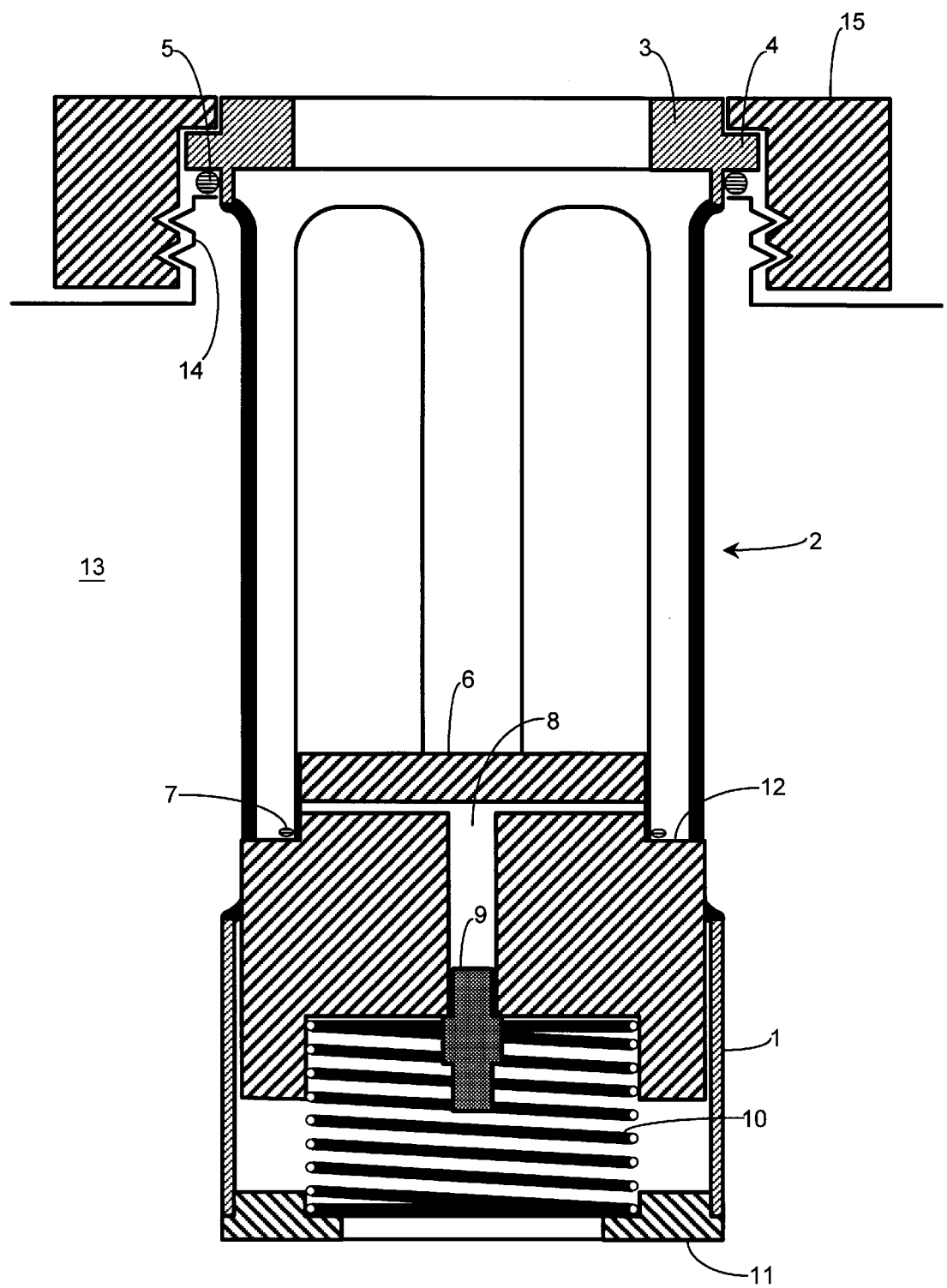
FIG. 2 shows a cross sectional view of the preferred embodiment of the present invention with the plunger in a depressed position.

FIG. 2 shows a cross sectional view of the preferred embodiment of the present invention with plunger 6 in a depressed position. In this position, plunger 6 has been forced axially downward towards the bottom of housing 1, compressing coil spring 10. The circular opening at the top of housing 1 is now open, and windows 2 are exposed to allow fuel flow through windows 2 into fuel tank 13.

Figure 3:
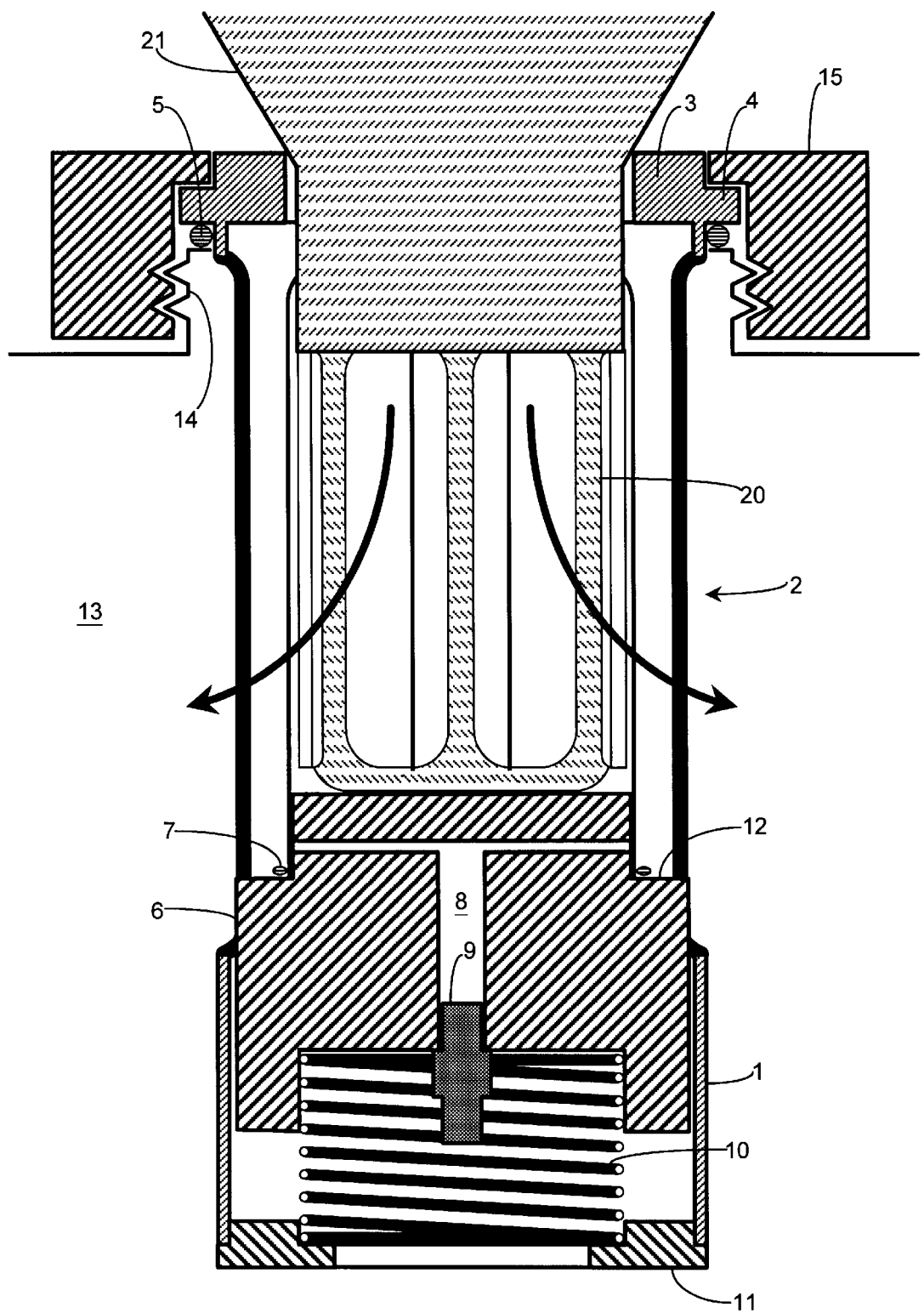
FIG. 3 shows a cross sectional view of the preferred embodiment of the present invention in operative position with the fueling sleeve of a quick-fill fuel container depressing the plunger.

FIG. 3 shows a cross sectional view of the preferred embodiment of the present invention in operative position with fueling sleeve 20 of a quick-fill fuel container 21 depressing plunger 6. The arrows indicate the flow path of fuel pouring out of fuel container 21, through the windows of fueling sleeve 20, through windows 2 and into fuel tank 13.

In operation, the standard gas cap is unscrewed from threaded gas cap flange 14 of fuel tank 13 and set aside. Housing 1 and the plunger assembly is inserted into the gas cap opening of fuel tank 13 until first sealing ring 5 engages the top lip of threaded gas cap flange 14. Housing 1 and the plunger assembly is secured in place by screwing retaining cap 15 securely onto threaded gas cap flange 14. In the normally closed position of plunger 6, sealing rings 5 and 7 provide an air- and fuel-tight seal. Check valve 9 allows outside air to be drawn into fuel tank 13 through venting orifice 8 to relieve any vacuum that may occur as fuel is drawn into the engine from fuel tank 13.

When refueling is required, the nozzle of quick-fill container 21 is aligned with plunger 6 and inserted into the quick-fill cap, partially depressing plunger 6. The fuel release mechanism of container 21 is then actuated, extending fueling sleeve 20 which exposes the windows of fueling sleeve 20, and further depresses plunger 6 which exposes windows 2 allowing fuel to flow from container 21 into the fuel tank 13 through the windows.

When refueling is complete, the fuel release mechanism of container 21 is released and fuel container 21 is removed from the quick-fill cap. This allows plunger 6 to return to its normally closed position. The motorcycle is now ready to continue the race.

After the race event, the quick-fill fuel cap is easily and quickly removed by unscrewing retaining cap 15 and removing housing 1 and the plunger assembly. The standard gas cap can now be reinstalled, allowing refueling by a standard fuel nozzle at a service station.

While a preferred embodiment of removable quick-fill fuel cap has been particularly shown and described, it is not intended to be exhaustive nor to limit the invention to the embodiment disclosed. It will be apparent to those skilled in the art that modifications can be made to the present invention without departing from the scope and spirit thereof. For example, the windowed cylindrical housing could alternatively be formed of a plurality of support rods extending into the gas tank and attached to an upper mounting ring that rests on the upper lip of the threaded gas cap flange and having the backstop ring attached to the distal ends of the supporting rods. Also, any suitable component materials may be used and are not limited to those of the preferred embodiment. It is intended that the scope of the invention be defined by the claims appended hereto and their equivalents.

What is claimed is:

1. A removable quick-fill fuel cap for use in a refueling system having a fuel tank with a threaded gas cap flange, and a fuel container with a nozzle and a fuel release mechanism, said removable quick-fill fuel cap comprising:

a hollow housing having an outer shoulder and an inner shoulder near the top of said housing, said inner shoulder defining a fuel inlet port, said housing further comprising windows therethrough, said housing adapted to be disposed within said gas cap flange such that said outer shoulder rests against said gas cap flange;

a plunger slidably disposed within said housing;

means for biasing said plunger to a normal position against said inner shoulder, thereby closing said fuel inlet port; and a retaining cap adapted to threadably engage said gas cap flange, said retaining cap impinging on said outer shoulder thereby securing said housing to said gas cap flange, said retaining cap further comprising an axial opening allowing full access to said fuel inlet port;

whereby when said fuel container nozzle is inserted into said fuel inlet port and said fuel release mechanism is actuated, thereby depressing said plunger within said housing, fuel flows out of said nozzle and through said housing windows into said fuel tank.

2. The removable quick-fill fuel cap of claim 1, wherein said housing comprises an integral cylindrical manufacture with window means therethrough.

3. The removable quick-fill fuel cap of claim 1, wherein said housing comprises an upper ring comprising said inner and outer shoulders, and a plurality of side rods extending from said upper ring, said plunger being slidably disposed within said side rods.

4. The removable quick-fill fuel cap of claim 1, wherein said means for biasing comprises backstop means connected to said housing and a spring disposed between said plunger and said backstop means, said spring reacting against said backstop means to bias said plunger to its said normal position.

5. The removable quick-fill fuel cap of claim 1, wherein said plunger further comprises a venting orifice allowing equalization of pressure between the inside of said fuel tank and the atmosphere.

6. The removable quick-fill fuel cap of claim 5, wherein said plunger further comprises a check valve in communication with said venting orifice allowing the dissipation of a vacuum within said fuel tank to said atmosphere.

7. The removable quick-fill fuel cap of claim 1, wherein said plunger top edge, said retaining cap and said inner shoulder are flush when said quick-fill fuel cap is secured to said threaded gas cap flange.

8. The removable quick-fill fuel cap of claim 7, wherein said plunger top surface is substantially flat.

9. The removable quick-fill fuel cap of claim 1, wherein said retaining cap and said inner shoulder are flush when said quick-fill fuel cap is secured to said threaded gas cap flange, said inner shoulder comprises an inner edge that is cambered into said fuel inlet, and said cambered edge is flush with said plunger top edge.

10. The removable quick-fill fuel cap of claim 9, wherein said plunger top surface is substantially flat.

* * * * *